United States Patent
Cheng (10) Patent No.: US 11,620,007 B2
(45) Date of Patent: Apr. 4, 2023

(54) MOUSE DEVICE

(71) Applicant: CHICONY ELECTRONICS CO., LTD., New Taipei (TW)

(72) Inventor: Yu-Chih Cheng, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/479,440

(22) Filed: Sep. 20, 2021

(65) Prior Publication Data

US 2022/0137725 A1 May 5, 2022

(30) Foreign Application Priority Data

Oct. 29, 2020 (TW) ................................ 109137701

(51) Int. Cl.
*G06F 3/0362* (2013.01)
*G06F 3/0354* (2013.01)

(52) U.S. Cl.
CPC ........ *G06F 3/0362* (2013.01); *G06F 3/03543* (2013.01)

(58) Field of Classification Search
CPC .......................... G06F 3/03543; G06F 3/0362
See application file for complete search history.

(56) References Cited

U.S. PATENT DOCUMENTS

| | | | | |
|---|---|---|---|---|
| 2002/0158844 A1* | 10/2002 | McLoone | ........... | G06F 3/03543 345/163 |
| 2004/0239629 A1* | 12/2004 | Koo | ...................... | G06F 3/0362 345/163 |
| 2005/0110757 A1* | 5/2005 | Lu | ......................... | G06F 3/0312 345/163 |
| 2005/0146500 A1* | 7/2005 | Cheng | .................... | H01H 25/04 345/163 |
| 2007/0146324 A1* | 6/2007 | Blandin | ................ | G06F 3/0362 345/163 |
| 2008/0165128 A1* | 7/2008 | Cheng | ................. | G06F 3/03543 345/163 |
| 2010/0085306 A1* | 4/2010 | Wu | ........................ | G06F 3/0362 345/163 |
| 2010/0245248 A1* | 9/2010 | Hsiao | ...................... | A61P 37/06 345/163 |
| 2013/0027305 A1* | 1/2013 | Peng | ...................... | G06F 3/0362 345/163 |
| 2013/0321272 A1 | 12/2013 | Deng | | |
| 2017/0205900 A1* | 7/2017 | Su | .......................... | G06F 3/038 |
| 2017/0213669 A1* | 7/2017 | Su | ........................ | G06F 3/03543 |
| 2017/0300137 A1* | 10/2017 | Chen | .................. | G06F 3/03543 |
| 2021/0041961 A1* | 2/2021 | Su | ........................ | G06F 3/03543 |

FOREIGN PATENT DOCUMENTS

| | | |
|---|---|---|
| CN | 111309167 A | 6/2020 |
| TW | 201351219 A | 12/2013 |
| TW | I633466 B | 8/2018 |

* cited by examiner

*Primary Examiner* — Ariel A Balaoing
(74) *Attorney, Agent, or Firm* — Muncy, Geissler, Olds & Lowe, P.C.

(57) ABSTRACT

A mouse device includes a housing and a wheel module. The housing includes an outer accommodating slot. The wheel module is detachably disposed in the outer accommodating slot. The wheel module includes a mounting base and a wheel. The mounting base has two opposite side walls, and the mounting base is located at a bottom of the outer accommodating slot. The wheel has two opposite pivots, wherein the two pivots are connected to the two side walls of the mounting base respectively.

11 Claims, 9 Drawing Sheets

MOUSE DEVICE

BACKGROUND

1. Technical Field

The present disclosure relates to a mouse device.

2. Description of the Related Art

A mouse device is a common computer peripheral input device that allows a user to move the mouse device to control the cursor of the operating window and perform functions such as word processing, graphics drawing, web browsing, etc. Commands can be transmitted by clicking the button of the mouse. In addition, the mouse device has a wheel module that allows the user to control the scrolling of the operating window by rotating the wheel module.

Generally, the housing of the mouse device has a through hole so as to allow the wheel module disposed in the housing to pass through the through hole and to be partially exposed to the outside of the housing for the user to rotate it. Since the wheel module has fixed appearance and size in this design, it is not possible to use other wheel modules having different sizes or different appearances to meet requirements of different users. For example, it is desirable to replace the wheel module with another wheel module of different outer diameter or width according to the usage habits of the user, or to replace it with a wheel module of different cover material according to the preference of the user.

SUMMARY

In view of the above-mentioned deficiencies, the main object of the present disclosure is to provide a mouse device, which is designed to have a housing including an outer accommodating slot, and a wheel module detachably disposed in the outer accommodating slot, thereby solving the problem that a wheel module of a mouse device cannot be replaced.

In order to achieve the above object, the present disclosure provides a mouse device including a housing and a wheel module. The housing includes an outer accommodating slot. The wheel module is detachably disposed in the outer accommodating slot. The wheel module includes: a mounting base and a wheel. The mounting base has two opposite side walls and is located at a bottom of the outer accommodating slot. The wheel has two opposite pivots, wherein the two pivots are connected to the two side walls of the mounting base respectively.

According to an embodiment of the present disclosure, the housing includes a first fixing structure disposed in the outer accommodating slot. The wheel module includes a second fixing structure disposed at the mounting base. When the wheel module is disposed in the outer accommodating slot, the first fixing structure and the second fixing structure are connected to each other to fix the wheel module in the outer accommodating slot.

According to an embodiment of the present disclosure, the mouse device further includes a circuit board and a middle button control board. The circuit board is disposed in the housing. The middle button control board is disposed at the outer accommodating slot, and the middle button control board has one end extending into the housing to be electrically connected to the circuit board.

According to an embodiment of the present disclosure, the first fixing structure and the second fixing structure are each a magnet, and the first fixing structure is disposed between the middle button control board and the bottom of the outer accommodating slot.

According to an embodiment of the present disclosure, the first fixing structure and the second fixing structure are each an engaging structure, the second fixing structure is on at least one of the two side walls of the mounting base, and the first fixing structure extends upward from the middle button control board.

According to an embodiment of the present disclosure, the middle button control board has a first positioning portion, the mounting base has a second positioning portion. When the wheel module is disposed in the outer accommodating slot, the first positioning portion and second positioning portion correspond to each other.

According to an embodiment of the present disclosure, the wheel module further includes a spring plate disposed on the inner side of the side wall of the mounting base. The wheel has a plurality of protrusions located on one side of the wheel. When the wheel rotates inside the mounting base, the plurality of protrusions is respectively in contact with the spring plate.

According to an embodiment of the present disclosure, the wheel module further includes an outer ring sleeved on the outside of the wheel.

According to an embodiment of the present disclosure, the wheel has a plurality of ribs, and the ribs are arranged equidistantly.

According to an embodiment of the present disclosure, the mouse device further includes an optocoupler component disposed in the housing. The optocoupler component includes an optical transmitter and an optical receiver. The light emitted by the optical transmitter is received by the optical receiver or is blocked by at least one of the ribs.

According to an embodiment of the present disclosure, the outer accommodating slot has a first through hole and a second through hole on opposite sides of the outer accommodating slot. The optical transmitter is close to the first through hole, the optical receiver is close to the second through hole. The two side walls of the mounting base respectively have a third through hole and a fourth through hole. The first through hole, the second through hole, the third through hole, and the fourth through hole are arranged in the same straight line.

According to an embodiment of the present disclosure, the housing includes an upper cover and a lower cover. The upper cover has a first groove, and the lower cover has a second groove second groove. The first groove and the second groove jointly form the outer accommodating slot.

As described above, the mouse device of the present disclosure includes a housing and a wheel module. The housing includes an outer accommodating slot, and the wheel module is detachably disposed in the outer accommodating slot. In addition, the wheel module includes a mounting base and a wheel, and the wheel is connected to the mounting base through a pivot. When the wheel module is placed in the outer accommodating slot, the mounting base is located at the bottom of the outer accommodating slot. With the design of the wheel module detachably disposed in the outer accommodating slot, the wheel module of the mouse device can be replaced with a variety of wheel modules of different sizes or appearances according to the user's preferences or requirements.

BRIEF DESCRIPTION OF THE DRAWINGS

The accompanying drawings are included to provide a further understanding of the disclosure, and are incorporated

DETAILED DESCRIPTION OF THE EMBODIMENTS

In order to make the structure and characteristics as well as the effectiveness of the present disclosure to be further understood and recognized, the detailed description of the present disclosure is provided as follows along with embodiments and accompanying figures. The following embodiments are only used to better illustrate the technical solutions of the present disclosure and is not intended to limit the scope of the present disclosure.

In the description of each embodiment, the terms "first", "second", and "third" are used to describe different elements, which are not limited by such predicates. In the description of the each embodiment, the terms "coupling" or "connection" mean that two or more components are directly making contact with each other physically or electrically, or making physical or electrical contact with each other indirectly, and "coupling" or "connect" can also refer to the mutual operation or action of two or more components. In addition, for the convenience and clarity of the description, the thickness or size of each element in the drawings is expressed in an exaggerated or omitted or general manner for the understanding and reading of those familiar with the art, and the size of each element is not the actual size, and it is not used to limit the conditions for the implementation of the present disclosure. Therefore, it has no technical significance. Any modification of structure, change of proportional relationship or size adjustment which does not affect the effects and the goals of the present disclosure still falls within the scope of the technical content disclosed in the present disclosure. The same reference numerals will be used to indicate the same or similar elements in all the drawings.

Figure 1:
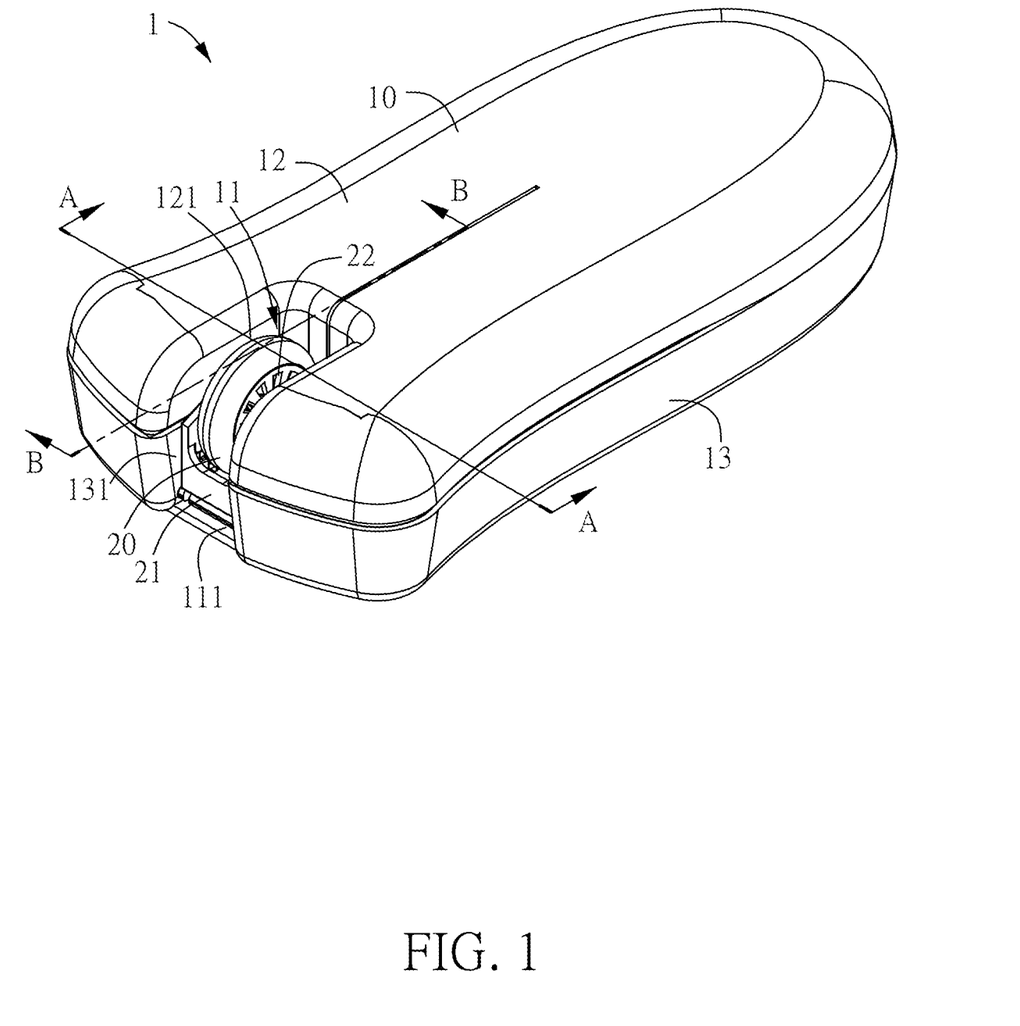
FIG. 1 illustrates a schematic view of a mouse device according to an embodiment of the present disclosure.
Figure 2:
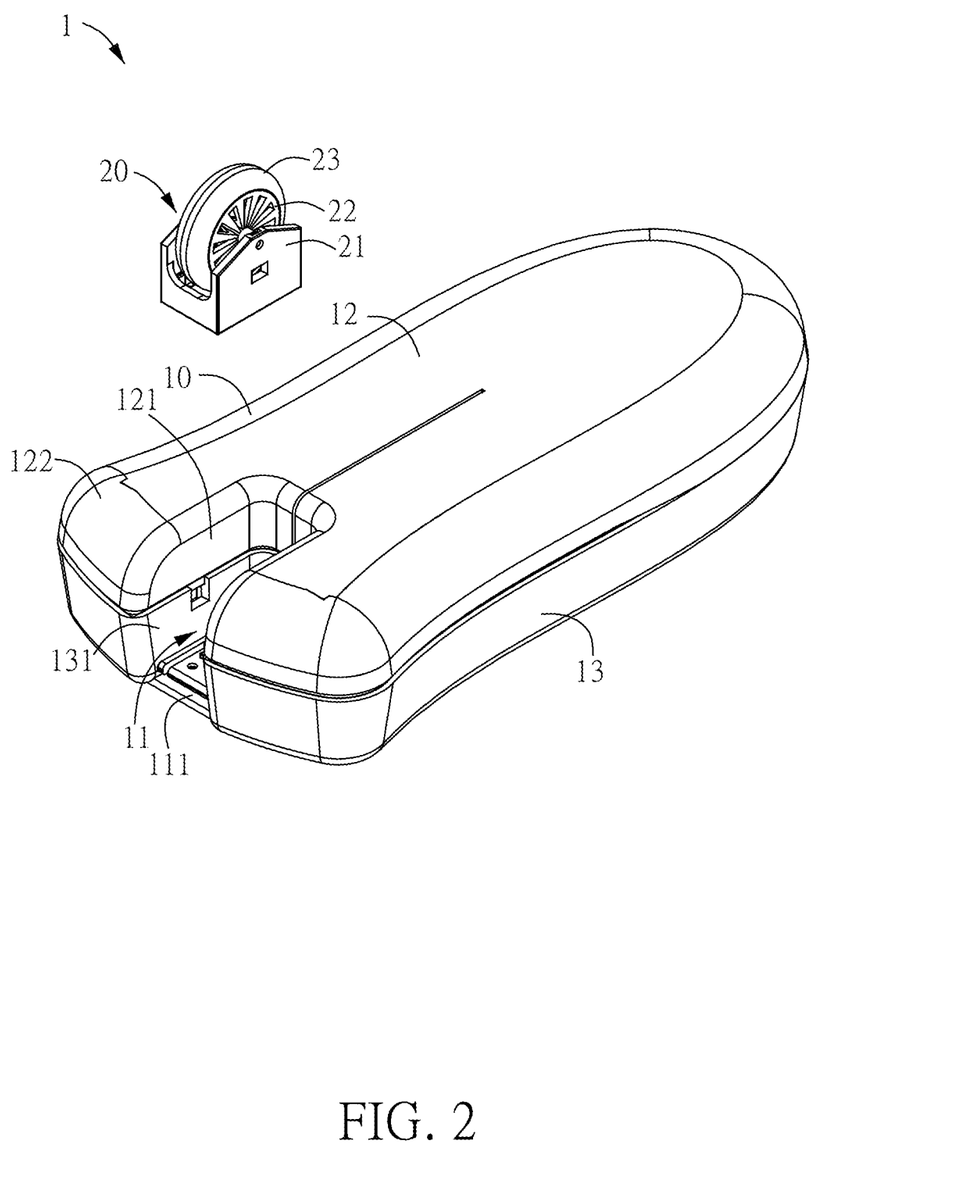
FIG. 2 illustrates an explosive schematic view of the wheel module and housing shown in FIG. 1.
Figure 3:
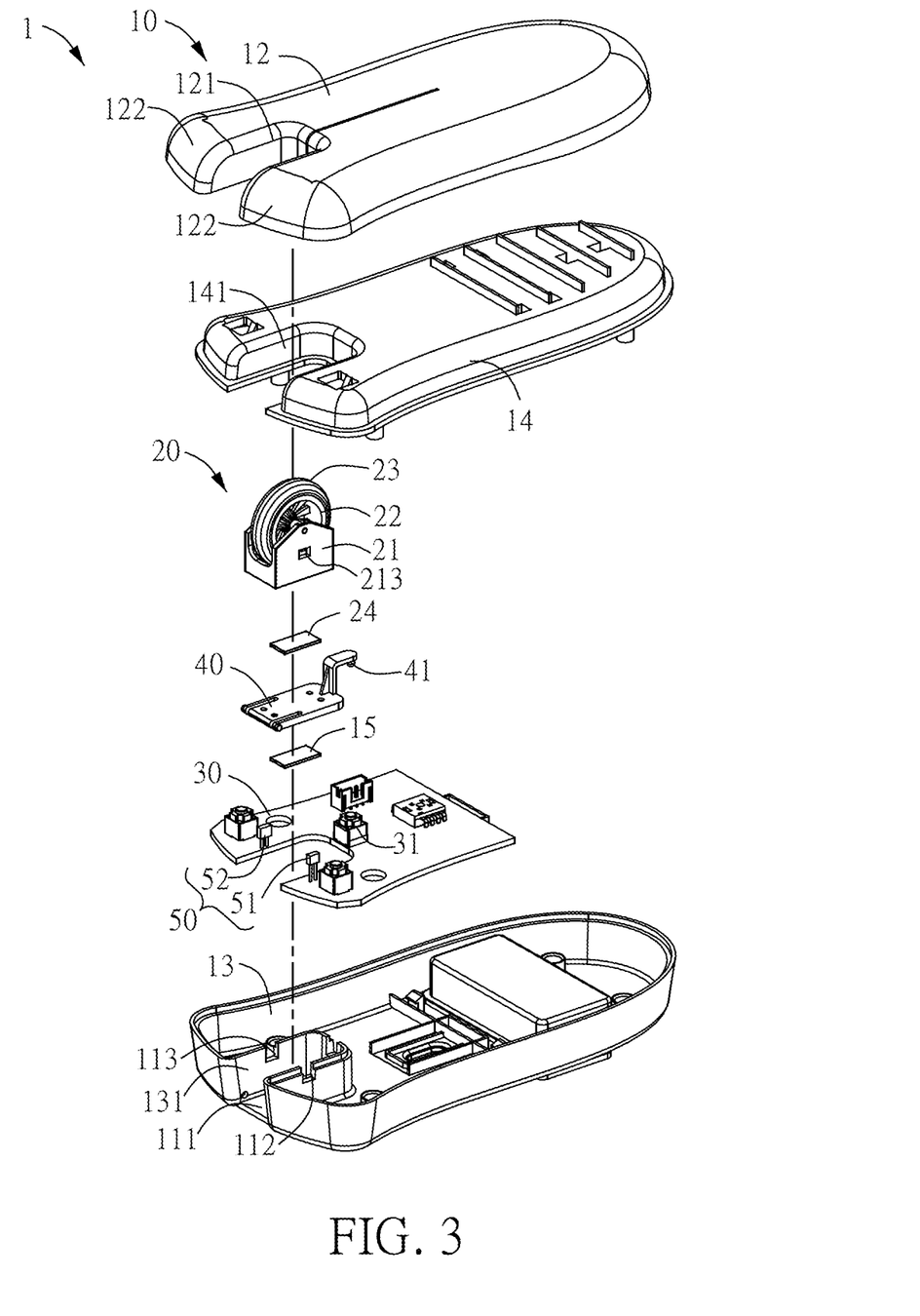
FIG. 3 illustrates an explosive schematic view of the mouse device shown in FIG. 1.

FIG. 1 illustrates a schematic diagram of a mouse device according to an embodiment of the present disclosure; FIG. 2 illustrates an explosive schematic view of the wheel module and housing shown in FIG. 1; and FIG. 3 illustrates an explosive schematic view of the mouse device shown in FIG. 1. Please refer to FIG. 1, FIG. 2, and FIG. 3. A mouse device 1 of this embodiment includes a housing 10 and a wheel module 20. The housing 10 includes an outer accommodating slot 11, and the wheel module 20 is detachably disposed in the outer accommodating slot 11. The size of the outer accommodating slot 11 can correspond with the size of the wheel module 20, such as the width of the wheel module 20, so that the wheel module 20 can be placed in the outer accommodating slot 11.

In this embodiment, the outer accommodating slot 11 is formed outside the housing 10, so that the whole structure of the wheel module 20 can be placed outside the housing 10, rather than be disposed in the housing 10 as the prior art. Specifically, the housing 10 includes an upper cover 12 and a lower cover 13. The upper cover 12 has a first groove 121, and the first groove 121 is a U-shaped groove extending backward from the central area of the front side of the upper cover 12. Correspondingly, the lower cover 13 has a second groove 131, which is also a U-shaped groove extending backward from the central area of the front side of the lower cover 13. After the upper cover 12 and the lower cover 13 are assembled, the first groove 121 corresponds to the second groove 131, so that the first groove 121 and the second groove 131 jointly form the outer accommodating slot 11. Further, the wheel module 20 can be directly removed from the outer accommodating slot 11 without removing the upper cover 12. The upper cover 12 is a button cover, and the upper cover 12 forms at least one button 122 at one end comprising the first groove 121. In this embodiment, the upper cover 12 has two buttons 122 formed at one end comprising the first groove 121, and the two buttons 122 can be disposed on two sides of the first groove 121, respectively. In some embodiments, the housing 10 further includes an inner cover 14, which is disposed below the upper cover 12, as shown in FIG. 3. Correspondingly, the inner cover 14 has a third groove 141, and the third groove 141 corresponds to the first groove 121 and the second groove 131. The configuration of the third groove 141 is the same as that of the first groove 121, so that the upper cover 12 (button cover) can be sleeved on the outside of the inner cover 14. In other embodiments, the housing 10 can also be a single housing, or the upper cover 12 (button cover) and the inner cover 14 can be a single cover, or the inner cover 14 and the lower cover 13 is a single cover, and any other configurations are possible.

Figure 4:
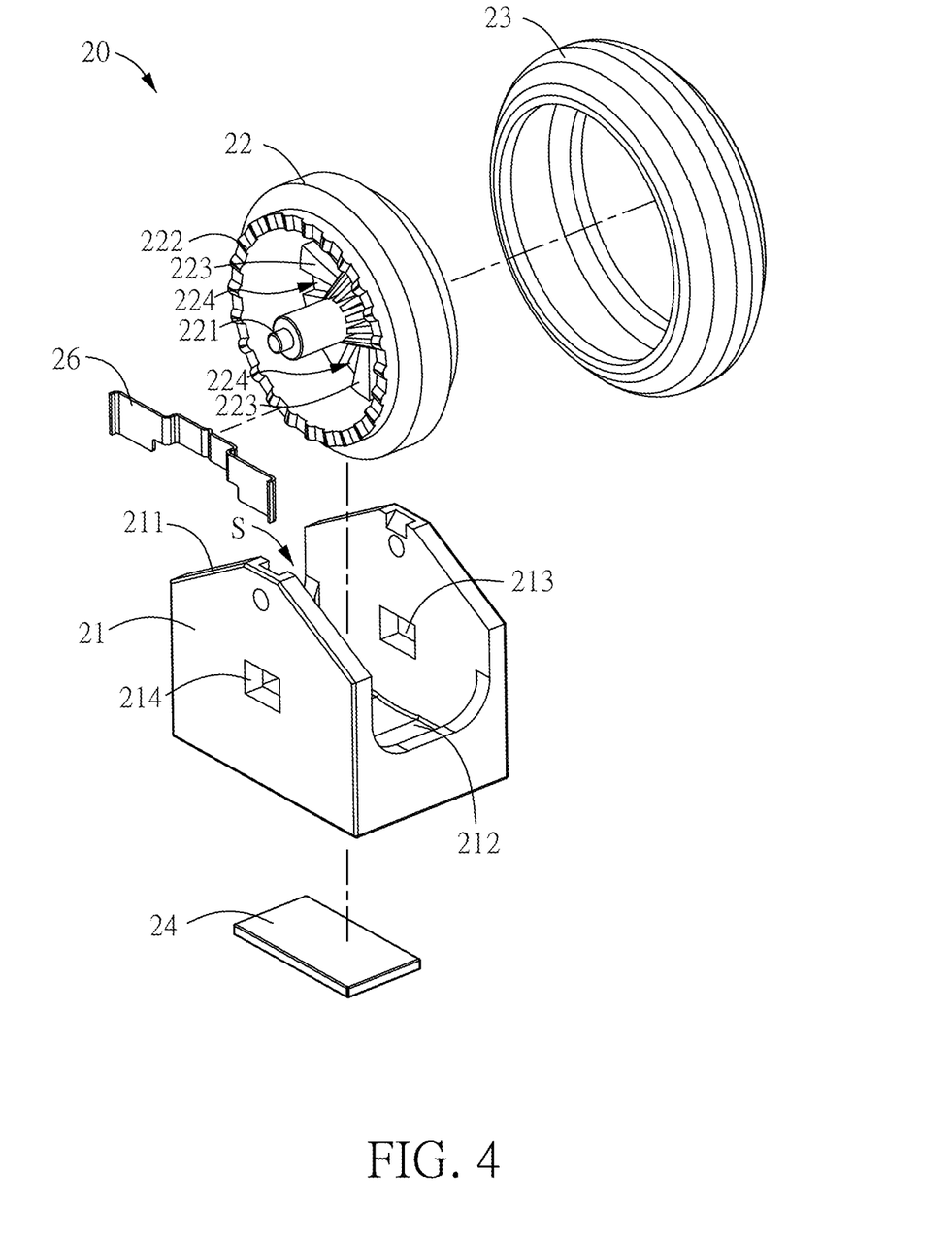
FIG. 4 illustrates an explosive schematic view of the wheel module shown in FIG. 3.

FIG. 4 illustrates an explosive schematic view of the wheel module shown in FIG. 3. Please refer to FIGS. 3 and 4. In this embodiment, the wheel module 20 includes a mounting base 21 and a wheel 22. The mounting base 21 has two opposite side walls 211. Specifically, the mounting base 21 may be a square-shaped slot, and in addition to the two opposite side walls, it also has a front wall, a rear wall, and a bottom 212. The wheel 22 is disposed in the accommodating space S formed by the front wall, the rear wall, the side walls 211, and the bottom 212.

In addition, the wheel 22 has two opposite pivots 221. In other words, the two pivots 221 are located on two opposite sides of the wheel 22. FIG. 4 only shows the pivot 221 on one side. The pivots 221 on two opposite sides can be respectively connected to the two side walls 211 of the mounting base 21, that is, the wheel 22 can be pivotally connected to the mounting base 21, so that the wheel 22 can rotate in the mounting base 21. When the wheel module 20 is assembled to the outer accommodating slot 11, the mounting base 21 is located at a bottom 111 of the outer accommodating slot 11, as shown in FIGS. 1 and 2.

In an embodiment, the designer or manufacturer of the mouse device 1 can provide a variety of different wheel modules 20 having wheels 22 of different sizes for users to choose from. Specifically, a user can choose a wheel module 20 with a wheel 22 of a specific size according to usage habits or preferences, and place the wheel module 20 in the outer accommodating slot 11. In another embodiment, wheels 22 with different outer diameters or widths can also be provided for users to choose from. After the user chooses the wheel 22 with a specific outer diameter or width, the user can assemble it to the mounting base 21. Then the wheel 22 and the mounting base 21 can be placed (that is, the whole of the wheel module 20) into the outer accommodating slot 11. Therefore, the structural design of the mouse device 1 of this embodiment allows the user to replace the original wheel module with a wheel module 20 having wheels 22 of different sizes according to their requirements.

Preferably, the wheel module 20 of this embodiment further includes an outer ring 23 which is sleeved on the outside of the wheel 22. When the user operates the wheel module 20, the user touches the outer ring 23. Therefore, the outer ring 23 can be made of a soft material, such as but not limited to rubber, silicone, etc., to enhance the comfort of the user's operation and provide the anti-slip effect. In an embodiment, the designer or manufacturer of the mouse device 1 can provide outer rings 23 of different sizes or different materials for the user to choose from and/or to replace the old outer ring. In other words, the user can choose a suitable wheel 22 and outer ring 23 according to user's requirements.

Preferably, the wheel module 20 and the outer accommodating slot 11 comprise a fixing structure therein, so that the wheel module 20 can be fixed in the outer accommodating slot 11, making it not easy to detach from the outer accommodating slot 11 when the user is moving or operating the mouse device 1. The fixing structure can be, for example, but not limited to, a structure or element that can be fixed, such as a snap structure, a magnet, or a devil felt. In this embodiment, the wheel module 20 and the outer accommodating slot 11 are magnetically attached to each other to be fixed. For example, the outer accommodating slot 11 is equipped with a magnet, and the mounting base 21 is a metal piece; or the outer accommodating slot 11 and the wheel module 20 are both equipped with magnets. The specific description is illustrated as follows.

Figure 5A:
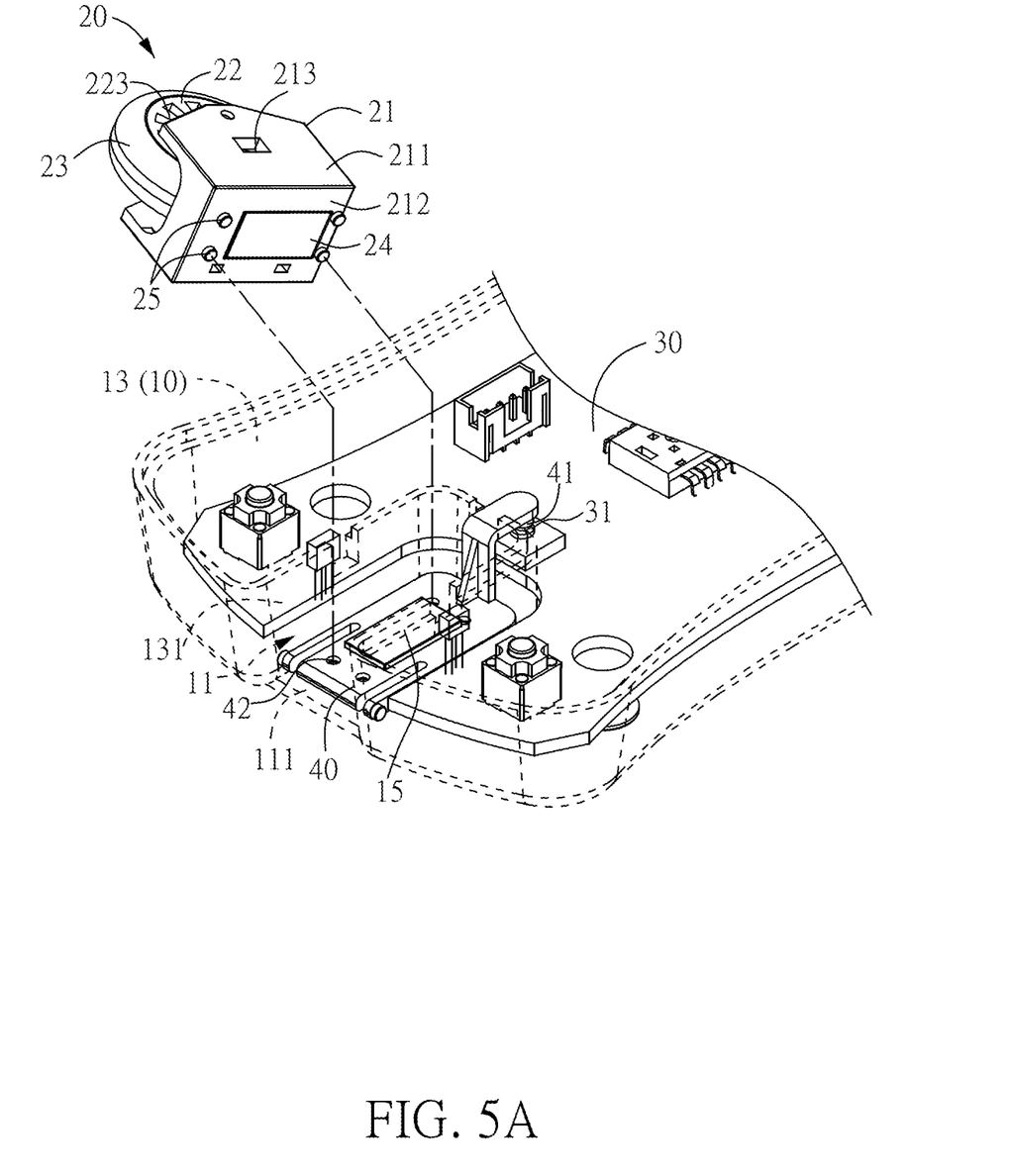
FIG. 5A illustrates an explosive schematic view of a portion of the housing and the wheel module shown in FIG. 2.
Figure 5B:
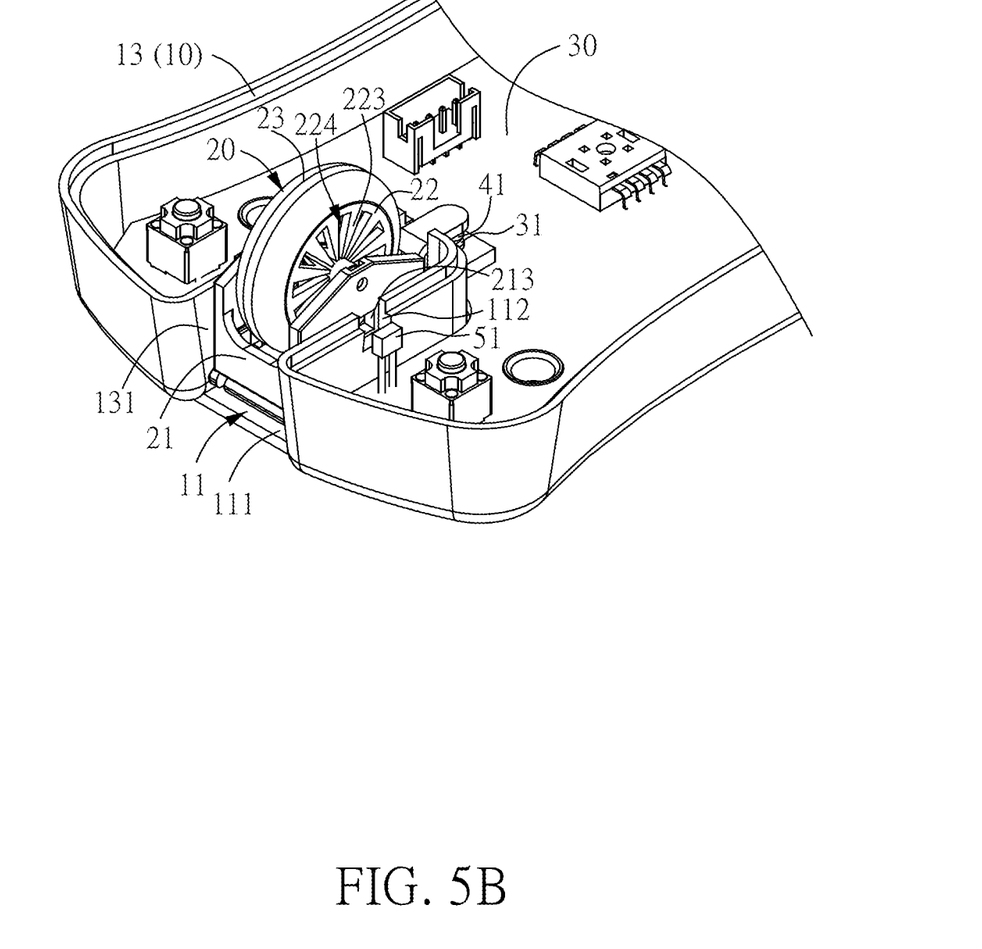
FIG. 5B illustrates a schematic view of the wheel module shown in FIG. 5A placed in the outer accommodating slot.
Figure 6A:
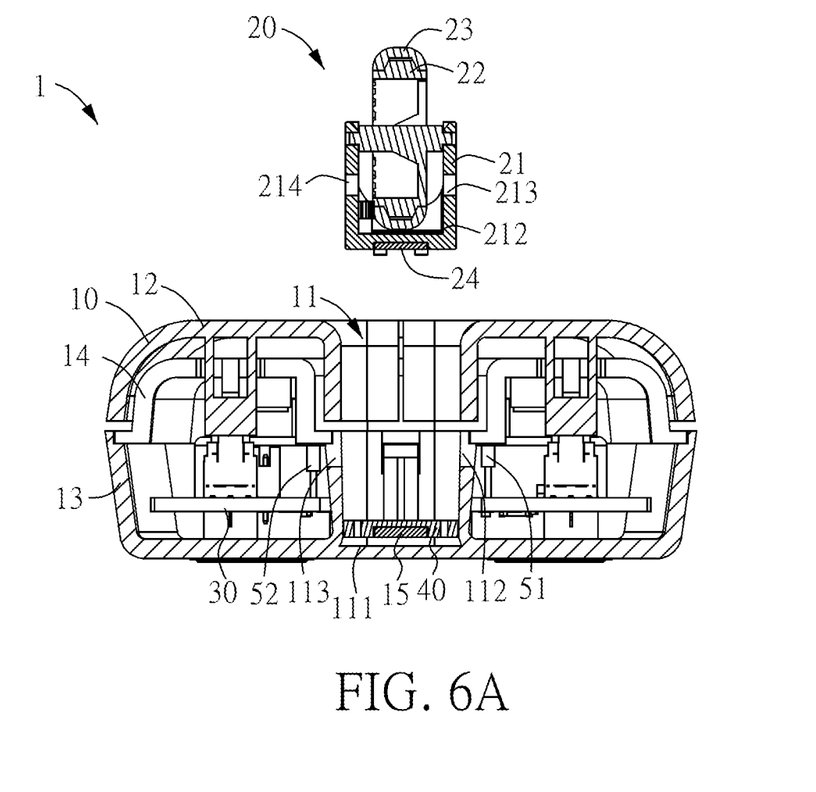
FIG. 6A illustrates a cross-sectional view of the mouse device shown in FIG. 2.
Figure 6B:
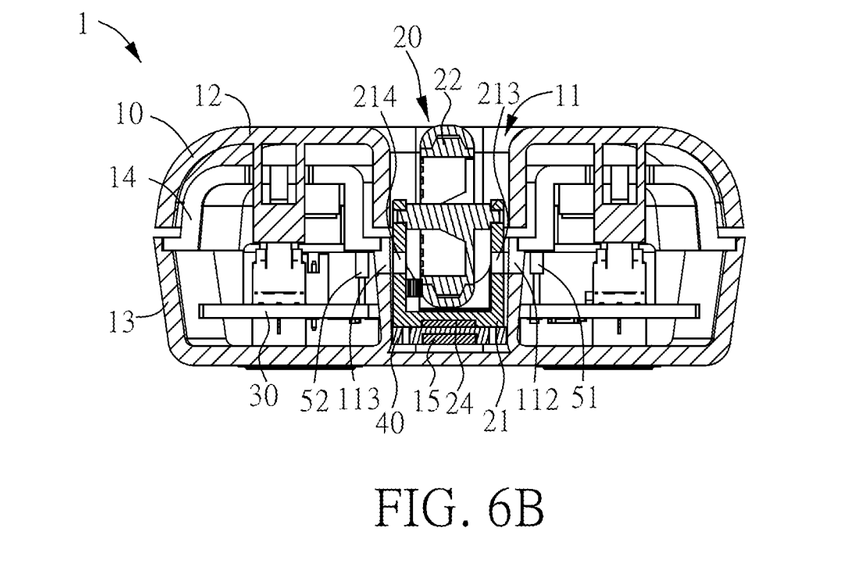
FIG. 6B illustrates a cross-sectional view of the mouse device shown in FIG. 1 along the line A-A.
Figure 6C:
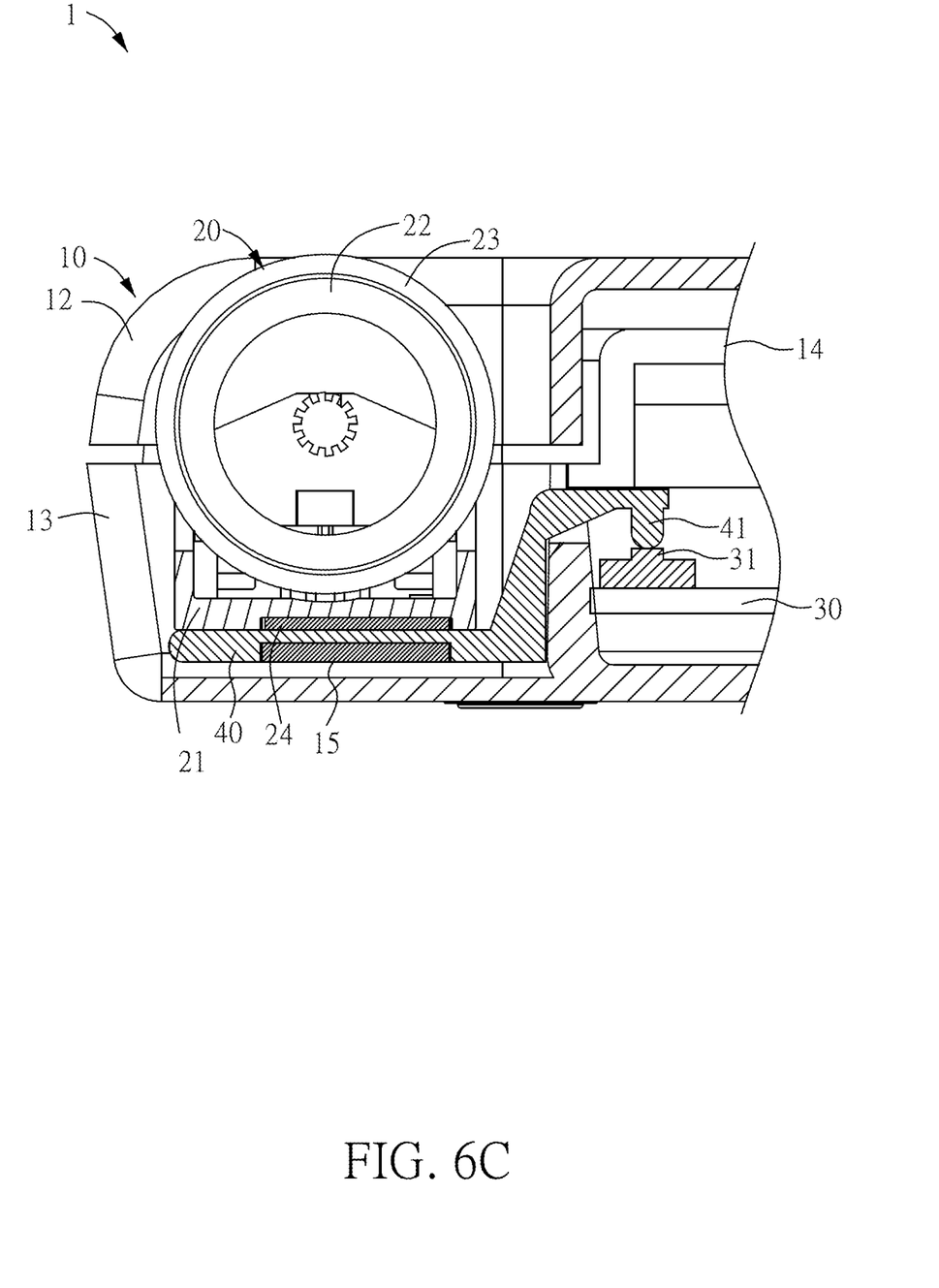
FIG. 6C illustrates a cross-sectional view of the mouse device shown in FIG. 1 along the line B-B.

FIG. 5A illustrates an explosive schematic view of a portion of the housing 10 and the wheel module 20 shown in FIG. 2; and FIG. 5B illustrates a schematic view of the wheel module 20 shown in FIG. 5A placed in the outer accommodating slot. It is noted that a portion of the housing 10 shown in FIG. 5A is a portion of the lower cover 13. FIG. 6A illustrates a cross-sectional view of the mouse device shown in FIG. 2; FIG. 6B illustrates a cross-sectional view of the mouse device shown in FIG. 1 along the line A-A; and FIG. 6C illustrates a cross-sectional view of the mouse device shown in FIG. 1 along the line B-B. Please refer to FIG. 4, FIG. 5A, FIG. 5B, FIG. 6A, FIG. 6B, and FIG. 6C. Specifically, the housing 10 of this embodiment includes a first fixing structure 15 located inside the outer accommodating slot 11. Correspondingly, the wheel module 20 includes a second fixing structure 24, which is disposed on the mounting base 21. Taking the first fixing structure 15 and the second fixing structure 24 both as magnets as an example, when the wheel module 20 is disposed in the outer accommodating slot 11, the first fixing structure 15 the second fixing structure 24 are magnetically attracted and connected with each other, so that the wheel module 20 can be fixed in the outer accommodating slot 11. As shown in FIG. 5A and FIG. 6A, preferably, the first fixing structure 15 of this embodiment is disposed at the bottom 111 of the outer accommodating slot 11, and correspondingly, the second fixing structure 24 is disposed at the bottom 212 of the mounting base 21. When the wheel module 20 is placed in the outer accommodating slot 11, the first fixing structure 15 can correspond to the second fixing structure 24, and the magnetic attraction between the two can further propel the wheel module 20 to enter the outer accommodating slot 11, as shown in FIG. 5B and FIG. 6B.

In this embodiment, the mouse device 1 further includes a circuit board 30 and a middle button control board 40. The circuit board 30 is disposed in the lower cover 13 of the housing 10, and the middle button control board 40 is disposed at the bottom 111 of the outer accommodating slot 11. One end of the middle button control board 40 extends into the housing 10 and has a trigger portion 41 to be connected and/or electrically connected to the switch 31 on the circuit board 30, as shown in FIG. 5A. When the wheel 22 is pressed by the user, the mounting base 21 can press the middle button control board 40 down, so that the middle button control board 40 moves downward or swings downward with respect to a pivot, thereby allowing the trigger portion 41 to be pressed down and trigger the switch 31 to generate a click signal, and then the click signal can be transmitted to the circuit board 30, as shown in FIG. 6C.

In addition, the first fixing structure 15 of the housing 10 can be disposed at the middle button control board 40, and preferably disposed under the middle button control board 40; thus, the middle button control board 40 can fix the first fixing structure 15. In other words, the first fixing structure 15 is disposed between the middle button control board 40 and the bottom 111 of the outer accommodating slot 11, as shown in FIG. 6A. With the above mentioned structure, when the wheel 22 is pressed by the user, the wheel 22 can effectively drive the middle button control board 40 to trigger the switch 31, and the second fixing structure 24 can still be coupled with the first fixing structure 15 with the middle button control board sitting there-between.

In an embodiment, the first fixing structure 15 and the second fixing structure 24 may be devil felts that correspond with each other. For example, the first fixing structure 15 is the furry surface of the devil felt, which is disposed above the middle button control board 40 and is accommodated in the outer accommodating slot 11; the second fixing structure 24 is the rough surface of the devil felt, which is disposed on the bottom 212 of the mounting base 21. When the wheel module 20 is placed in the outer accommodating slot 11, the first fixing structure 15 (furry surface) can be connected to the corresponding second fixing structure 24 (rough surface) so as to allow the wheel module 20 to be fixed in the outer accommodating slot 11.

In another embodiment, the first fixing structure 15 and the second fixing structure 24 can correspond with each other to form an engaging structure. For example, the second fixing structure 24 is an engaging slot, which is located on one of the side walls 211 of the mounting base 21, and the first fixing structure 15 is a hook located in the outer accommodating slot 11 and extends upward from the side wall of the middle button control board 40. In some embodiments, the number of the second fixing structure 24 is two and the second fixing structures 24 are respectively located on the side walls 211 of the mounting base 21. The number of the first fixing structure 15 may correspond to the number of the second fixing structure 24. When the wheel module 20 is placed in the outer accommodating slot 11, the first fixing structure 15 (hook) is engaged with the second fixing structure 24 (engaging slot) to be connected to each other, so that the wheel module 20 is fixed in the outer accommodating slot 11.

Preferably, the outer accommodating slot 11 and the wheel module 20 may have a positioning structure in addition to fixed structures or components therebetween. Please refer to FIG. 5A. Specifically, the middle button control board 40 has a first positioning portion 42. Correspondingly, the mounting base 21 has a second positioning portion 25, which is located outside the bottom 212 of the mounting base 21. The first positioning portion 42 and the second positioning portion 25 correspond with each other. For example, the first positioning portion 42 is a positioning hole, and the second positioning portion 25 is a positioning column. When the wheel module 20 is placed in the outer accommodating slot 11, the positioning column (second positioning portion 25) can correspond to the positioning hole (first positioning portion 42) to achieve the positioning effect. In short, when the wheel module 20 is disposed in the outer accommodating slot 11, the first positioning portion 42 and the second positioning portion 25 correspond to each other. In other embodiments, the first positioning portion corresponding to the second positioning portion 25 can also be provided in the outer accommodating slot 11, or any other suitable places in the present disclosure.

Figure 7:
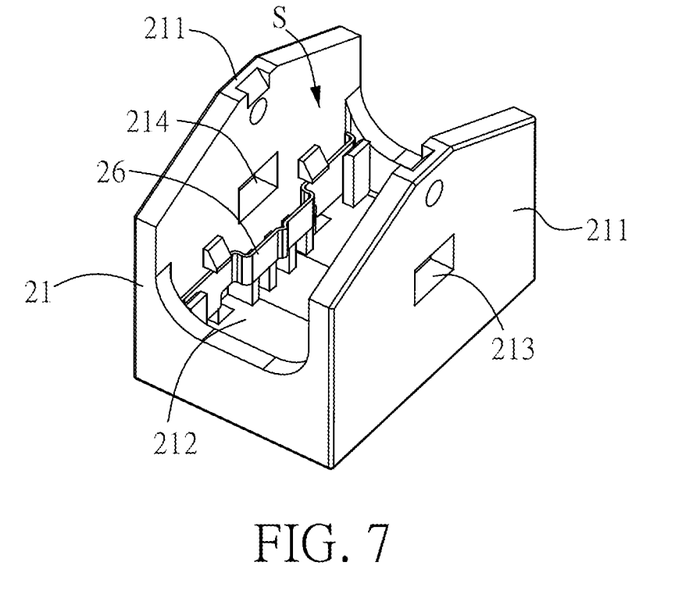
FIG. 7 illustrates a schematic view of the spring plate shown in FIG. 4 disposed on the mounting base.
Figure 8:
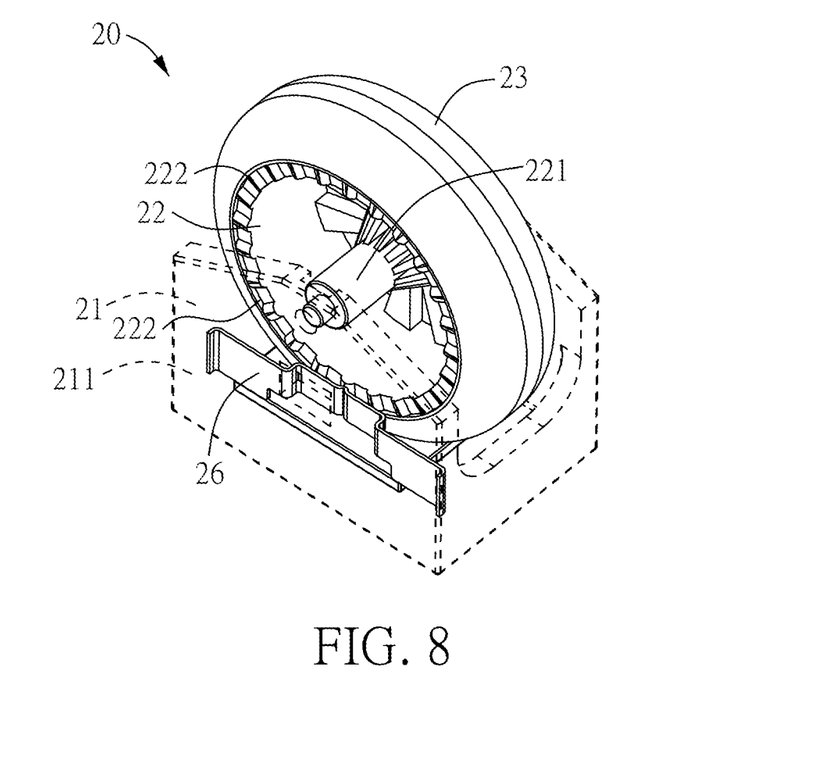
FIG. 8 illustrates a schematic view of the wheel module shown in FIG. 4 after being assembled.

FIG. 7 illustrates a schematic view of the spring plate shown in FIG. 4 disposed on the mounting base; and FIG. 8 illustrates a schematic view of the wheel module shown in FIG. 4 after being assembled. Please refer to FIG. 4, FIG. 7, and FIG. 8. Preferably, the wheel module 20 of this embodiment further includes a spring plate 26 disposed on the inner side of the side wall 211 of the mounting base 21. The wheel 22 has a plurality of protrusions 222 located on one side of the wheel 22. Specifically, the plurality of protrusions 222 is located on the side of the wheel 22 facing the spring plate 26. In other embodiments, the wheel module 20 may have two spring plates 26, which are respectively disposed on the inner side of the two opposite side walls 211. Correspondingly, the plurality of protrusions 222 can be located on the two sides of the wheel 22.

Preferably, the plurality of protrusions 222 is arranged on the side of the wheel 22 equidistantly. When the wheel 22 rotates in the mounting base 21, the plurality of protrusions 222 is in contact with the spring plate 26 respectively. Specifically, when one of the protrusions 222 moves to the position of the spring plate 26, it will press against the spring plate 26, and the spring plate 26 will exert a counter force on the protrusion 222. Therefore, when the wheel 22 rotates in the mounting base 21, the plurality of protrusions 222 arranged equidistantly will sequentially press against the spring plate 26, so that the user can feel the sense of segmentation during operation. In addition, the portion where the protrusion 222 is in contact with the spring plate 26 can be a curved surface, a flat surface, or a sharp point, or any other surface which can achieve the aforementioned sense of segmentation.

The user can control the scrolling of the operating window by rotating the wheel 22 of the wheel module 20, as shown in FIG. 5B, FIG. 6A, and FIG. 6B. The mouse device 1 of this embodiment is equipped with an optocoupler component 50 to detect the rotation of the wheel 22. Specifically, the mouse device 1 further includes an optocoupler component 50, which has an optical transmitter 51 and an optical receiver 52. The optocoupler component 50 of this embodiment is disposed on the circuit board 30, and is disposed inside the housing 10 along with the circuit board 30 to be located on the lower cover 13 of the housing 10. The optical transmitter 51 and the optical receiver 52 are respectively located on opposite sides of the second groove 131, that is, the optical transmitter 51 and the optical receiver 52 are located on the opposite sides of the outer accommodating slot 11 respectively.

Please refer to FIG. 3 and FIG. 6A, the outer accommodating slot 11 has a first through hole 112 and a second through hole 113 disposed on two opposite sides of the outer accommodating slot 11, respectively. The optical transmitter 51 is close to the first through hole 112, and the optical receiver 52 is close to the second through hole 113. Please refer to FIG. 3 and FIG. 6B. Correspondingly, the two opposite side walls 211 of the mounting base 21 have a third through hole 213 and a fourth through hole 214 respectively, and the first through hole, the second through hole 113, the third through hole 213, and the fourth through hole 214 are arranged substantially in the same straight line. With the above-mentioned structure, the light emitted by the optical transmitter 51 can pass through the first through hole 112, the second through hole 113, the third through hole 213, and the fourth through hole 214 to be received by the optical receiver 52.

Please refer to FIG. 4 and FIG. 5B, the wheel 22 can further have a plurality of ribs 223, and the ribs 223 are arranged equidistantly. The plurality of ribs 223 has openings 224 between each other. In other words, the wheel 22 has a plurality of openings 224, and the ribs 223 and the openings 224 are arranged at intervals. The openings 224 can be arranged equidistantly around the axis of the wheel 22. The light emitted by the optical transmitter 51 can pass through the first through hole 112, the second through hole 113, the opening 224, the third through hole 213, and the fourth through hole 214 to reach the optical receiver 52. When the wheel 22 rotates, the light emitted by the optical transmitter 51 will be blocked by at least one of the ribs 223. The rotation range of the wheel 22 can be obtained by the number of times the light is blocked, thereby controlling the scrolling of the window.

In summary, the mouse device of the present disclosure includes a housing and a wheel module. The housing includes an outer accommodating slot, and the wheel module is detachably disposed in the outer accommodating slot. In addition, the wheel module includes a mounting base and a wheel, and the wheel is connected to the mounting base through a pivot. When the wheel module is placed in the outer accommodating slot, the mounting base is located at the bottom of the outer accommodating slot. With the design of the wheel module detachably disposed in the outer accommodating slot, the wheel module of the mouse device can be replaced with a variety of wheel modules of different sizes or appearances according to the user's preferences or requirements. Besides, the flexibility of the mouse device in use is enhanced by equipping the mouse device with the above-mentioned removable and replaceable wheel modules.

It should be noted that although the present disclosure is disclosed above by embodiments, the embodiments are merely illustrative and not restrictive of the present disclosure. Equivalent implementation of, or equivalent changes made to without departing from the spirit of the present disclosure must be deemed falling within the scope of the present disclosure. Accordingly, the legal protection for the present disclosure should be defined by the appended claims.

What is claimed is:

1. A mouse device comprising:
   a housing including an upper cover and a lower cover, wherein the upper cover has a first groove, the lower cover has a second groove, the first groove and the second groove jointly form an outer accommodating slot, and the outer accommodating slot is formed outside the housing; and
   a wheel module detachably disposed in the outer accommodating slot, wherein the wheel module includes:
      a mounting base having two opposite side walls and being located at a bottom of the outer accommodating slot; and
      a wheel having two opposite pivots, wherein the two pivots are connected to the two side walls of the mounting base respectively.

2. The mouse device according to claim 1, wherein the housing includes a first fixing structure disposed in the outer accommodating slot, and the wheel module includes a second fixing structure disposed at the mounting base, when the wheel module is disposed in the outer accommodating slot, the first fixing structure and the second fixing structure are connected to each other to fix the wheel module in the outer accommodating slot.

3. The mouse device according to claim 2, further comprising:
   a circuit board disposed in the housing; and
   a middle button control board disposed at the outer accommodating slot, and the middle button control board having one end extending into the housing to be electrically connected to the circuit board.

4. The mouse device according to claim 3, wherein the first fixing structure and the second fixing structure are each a magnet, and the first fixing structure is disposed between the middle button control board and the bottom of the outer accommodating slot.

5. The mouse device according to claim 3, wherein the first fixing structure and the second fixing structure are each an engaging structure, the second fixing structure is on at least one of the two side walls of the mounting base, and the first fixing structure extends upward from the middle button control board.

6. The mouse device according to claim 3, wherein the middle button control board has a first positioning portion, the mounting base has a second positioning portion, and when the wheel module is disposed at the outer accommodating slot, the first positioning portion and second positioning portion correspond with each other.

7. The mouse device according to claim 1, wherein the wheel module further includes a spring plate disposed on the inner side of the side wall of the mounting base, and the wheel has a plurality of protrusions located on one side of the wheel, when the wheel rotates inside the mounting base, the plurality of protrusions is respectively in contact with the spring plate.

8. The mouse device according to claim 1, wherein the wheel module further includes an outer ring sleeved on the outside of the wheel.

9. The mouse device according to claim 1, wherein the wheel has a plurality of ribs, and the ribs are arranged equidistantly.

10. The mouse device according to claim 9, further comprising an optocoupler component disposed in the housing, the optocoupler component having an optical transmitter and an optical receiver, wherein the light emitted by the optical transmitter is received by the optical receiver or is blocked by at least one of the ribs.

11. The mouse device according to claim 10, wherein the outer accommodating slot has a first through hole and a second through hole on opposite sides of the outer accommodating slot, the optical transmitter is close to the first through hole, the optical receiver is close to the second through hole, and the two side walls of the mounting base respectively have a third through hole and a fourth through hole, wherein the first through hole, the second through hole, the third through hole, and the fourth through hole are arranged in the same straight line.

* * * * *